(No Model.)

G. D. HAWORTH.
CHECK LINE GUIDE FOR CORN PLANTERS.

No. 253,532. Patented Feb. 14, 1882.

Witnesses.
Franck L. Durand
D. W. Smith

Inventor.
Geo. D. Haworth
by A. W. Smith
Attorney

UNITED STATES PATENT OFFICE.

GEORGE D. HAWORTH, OF DECATUR, ILLINOIS.

CHECK-LINE GUIDE FOR CORN-PLANTERS.

SPECIFICATION forming part of Letters Patent No. 253,532, dated February 14, 1882.

Application filed October 31, 1881. (No model.)

*To all whom it may concern:*

Be it known that I, GEORGE D. HAWORTH, of Decatur, county of Macon, State of Illinois, have invented new and useful Improvements in Check-Line Guides for Corn-Planters, of which the following is a full, clear, and exact description, reference being had to the accompanying drawings, making part of this specification, in which—

Figure 1:
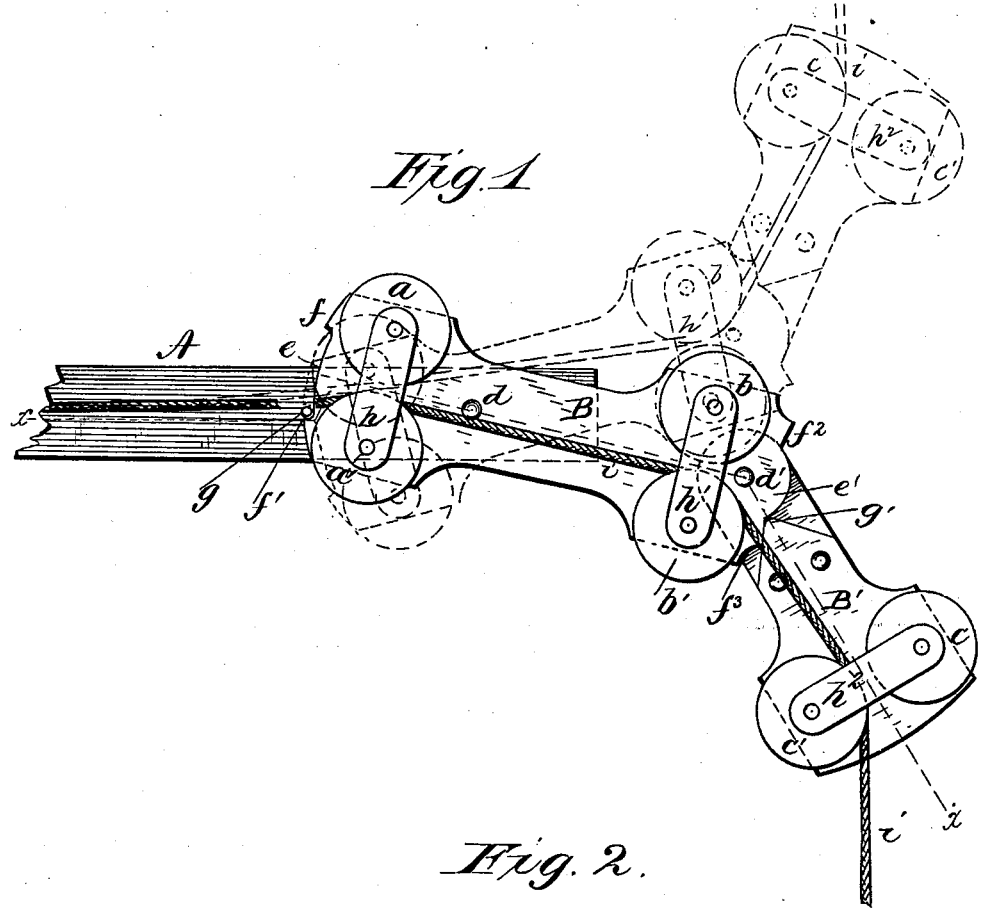
Figure 2:
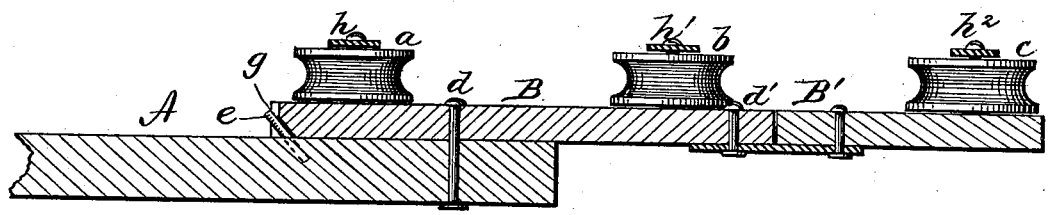

Figure 1 is a plan or top view of so much of a check-row attachment to corn-planters as is necessary to show my improvement; and Fig. 2 is a vertical transverse section of the same, taken on the line $x\ x$, Fig. 1.

My invention relates to the check-line guide for facilitating the taking up and paying out of the check-line or the transverse passage of the same over the machine in operation; and it consists in a novel construction of swiveling and jointed guide-pulley holder, adapted to automatically adjust itself, when required, from a position in which it takes up the line as the machine advances to that in which it pays out the same behind the machine, and vice versa, thereby facilitating the labor of the attendant or operator.

In the accompanying drawings, A represents one end of the main transverse bar of a check-row attachment to a corn-planter, and to which bar the forks or levers acted upon by the check-line in its passage over the machine are applied, (said parts being shown.) To each end of this bar is connected a swiveling plate or bar, B, made in I shape, or with expanded ends, adapting it to receive the pivots or journals of pulleys $a\ a'$ and $b\ b'$, arranged in pairs thereon, as shown. This plate or bar is pivoted near its inner end, at $d$, to the upper face of bar A, and has its extreme inner end formed at $e$ in the arc of a circle of which the pivot $d$ is the center, the portion or arc $e$ terminating in lugs or shoulders at $f f'$, which, in connection with a pin or stop at $g$ in the bar A, serve to limit the throw of the plate or bar B. To the outer swinging end of the bar B a second bar or plate, B', is pivoted, carrying at its outer expanded and swinging end a third pair of guide-pulleys, $c\ c'$. The outer swinging end of bar B is also formed in the arc of a circle of which the pivot $d'$, connecting plate B' with it, is the center, as shown at $e'$, said arc terminating, like arc $e$, in shoulders $f^2\ f^3$, forming stops to a lug or projection at $g'$ on the swiveling bar B', thereby limiting the throw or movement of plate B' upon or relatively to plate B. By this construction the movement of the plates B' and B relatively to each other and to the bar A are restricted substantially within the limits indicated by the full and dotted lines in Fig. 1, one indicating the position in which the line is taken up as the machine advances, the other the position of the guide in paying out the line behind the machine.

The guide-pulleys are arranged in pairs, as explained, and the upper ends of the journals of each pair are connected by transverse plates $h\ h'\ h^2$, which serve to stiffen and strengthen them against the strain or tension of the check-line.

By the arrangement of the swiveling plates, with their pulleys, as shown and described, it will be seen that the line indicated at $i$ will be turned gradually from the longitudinal position it occupies on the ground relatively to the path of the machine to one at right angles thereto, for crossing the path of the machine, and will be turned back again in a similar manner in paying it out again behind the machine, thus avoiding the abrupt bending of the line and the strain and friction consequent thereon when rigid pulleys are employed, and especially adapting the device to the wire check-line in ordinary use. At the same time the arrangement of the swiveling plates enables the pulleys to adjust themselves under the tension of the line when the anchor is moved and the machine is turned at the end of the row to the work it is required to do, whether it be that of taking up the line as the machine advances or that of paying it out behind the machine after it has acted upon the check-row seeding devices. Supposing the full lines in Fig. 1 to represent the position the pulley-holder and pulleys occupy in paying out the cord or line, it will be seen that the line passes or is turned gradually from a position at right angles to the path of the machine to one in line parallel with said path, resting on the pulleys $a'$, $b'$, and $c'$, while in reversing the operation for taking up the line it passes into a position for crossing the machine and operating the seeding devices pressing upon the inner faces of pulleys c, b, and a, the cord or line in either case passing centrally over the bar A, as shown, adapting it to operate the seeding devices when moving in either direction.

Having now described my invention, I claim—

1. In a check-line guide for corn-planters, the swiveling and jointed pulley-holder, provided with pulleys arranged in pairs, substantially as described.

2. A check-line guide for corn-planters, composed of the jointed bar B and B' and the pulleys a a' b b' c c', arranged in pairs, substantially as and for the purpose described.

3. The combination, with the main frame bar of a check-row attachment to corn-planters, of the jointed and swiveling pulley-holder, with its guide-pulleys arranged and operating substantially as described.

4. The jointed and swiveling pulley-holder, provided with guide-pulleys and constituting the check-line guide, in combination with stops limiting the throw of the parts of the holder, substantially as described.

GEO. D. HAWORTH.

Witnesses:
THEO. COLEMAN,
W. E. HAWORTH.